Figure 2:
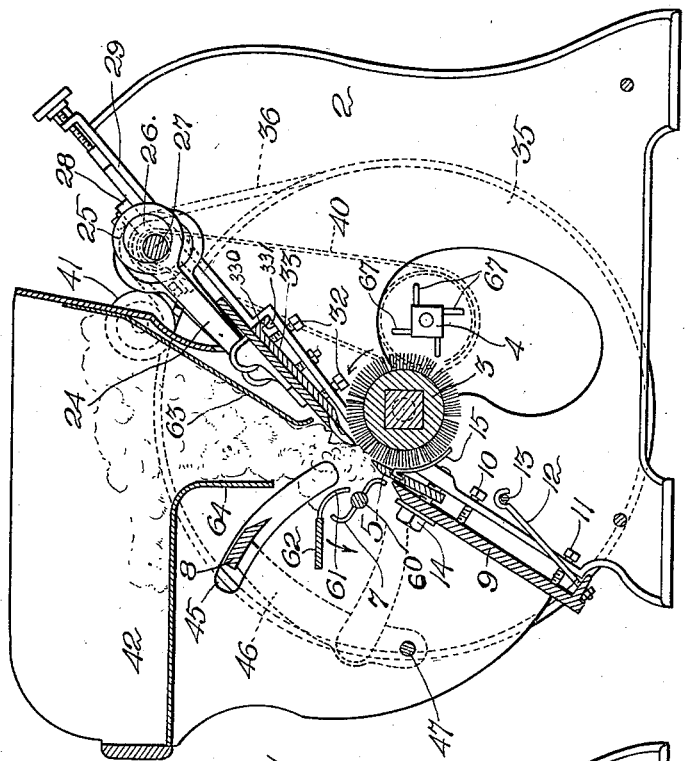

M. PRIOR.
ROLLER COTTON GIN.
APPLICATION FILED JUNE 10, 1909.

1,009,261.

Patented Nov. 21, 1911.

2 SHEETS—SHEET 1.

Witnesses:
Edward Maxwell
M. J. Spalding

Inventor:
Matthew Prior,
by Geo. S. Maxwell,
Attorney.

M. PRIOR.
ROLLER COTTON GIN.
APPLICATION FILED JUNE 10, 1909.
1,009,261.
Patented Nov. 21, 1911.
2 SHEETS—SHEET 2.
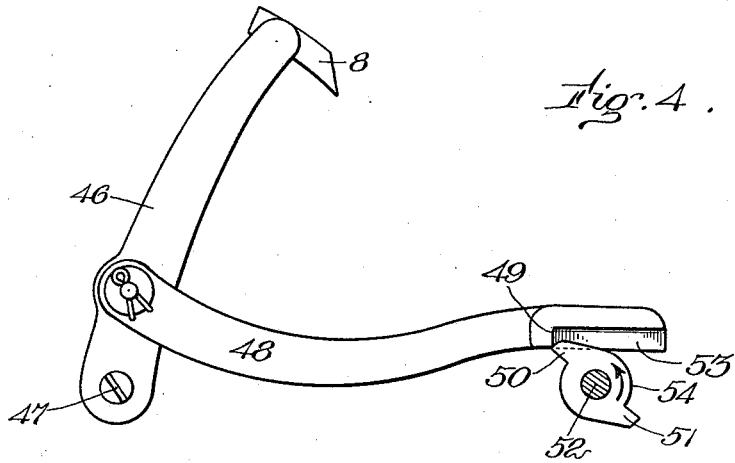
Fig. 4.
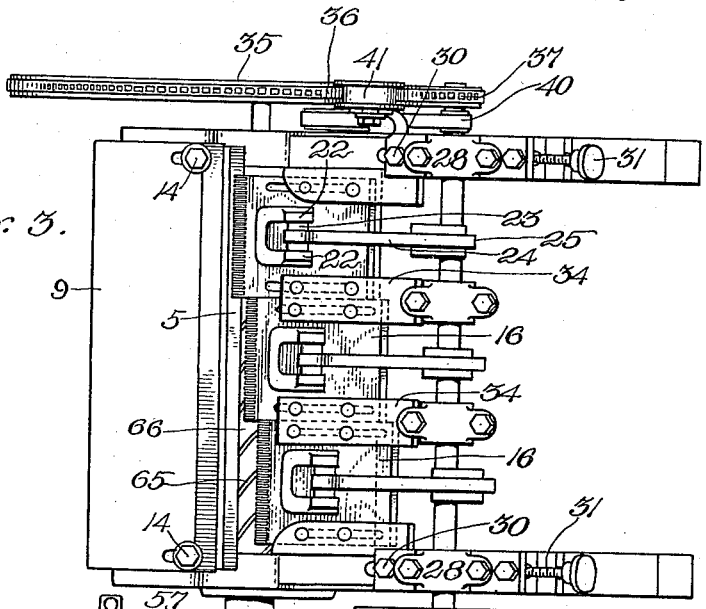
Fig. 3.
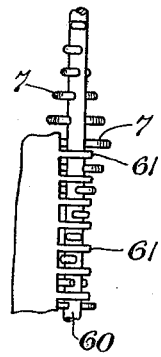
Fig. 5.
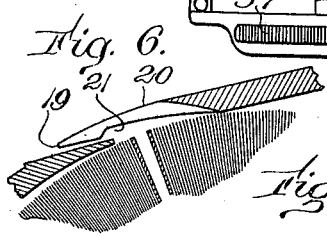
Fig. 6.
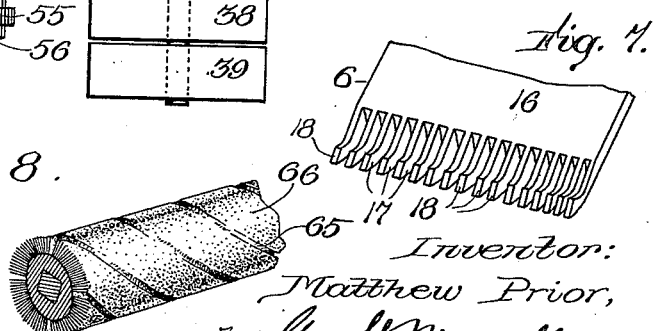
Fig. 7.
Fig. 8.
Witnesses:
Edward Maxwell.
M. J. Spalding.
Inventor:
Matthew Prior,
by Geo. H. Maxwell,
Attorney.
COLUMBIA PLANOGRAPH CO., WASHINGTON, D. C.

UNITED STATES PATENT OFFICE.

MATTHEW PRIOR, OF WATERTOWN, MASSACHUSETTS, ASSIGNOR OF ONE-FOURTH TO HAROLD L. FROST, OF ARLINGTON, MASSACHUSETTS.

ROLLER COTTON-GIN.

1,009,261.      Specification of Letters Patent.      Patented Nov. 21, 1911.

Application filed June 10, 1909. Serial No. 501,365.

*To all whom it may concern:*

Be it known that I, MATTHEW PRIOR, a citizen of the United States, and resident of Watertown, in the county of Middlesex and State of Massachusetts, have invented an Improvement in Roller Cotton-Gins, of which the following description, in connection with the accompanying drawings, is a specification, like letters on the drawings representing like parts.

The primary object of my invention is to increase the quantity of production while at the same time retaining the fine quality of the best roller gins. Also, besides simplifying the construction, I provide means to produce an even and continuous feed of the cotton, self-regulated, so that it will automatically maintain a maximum output under normal conditions, my gin being further constructed so as to prevent undue friction, danger of fire, etc., and to afford means for quick and accurate adjustment and inspection of all the separate parts.

I have found that by placing the knife and clearer at an angle of about thirty five degrees to the horizontal, so that, while substantially constituting the bottom of the hopper or cotton-feeding means, they permit the seeds, hulls, leaves, nails, stones, or the like to fall out by gravity instantly upon being released from the entangling staple, the knife being placed on the lower side, and the adjacent ginning surface having a downward movement toward said knife, a surprising increase in output of cotton is secured. The cotton rests directly on the face of the roller and is constantly pushed in place by a rotary seed grid or agitator and held down against the roller by a rising and falling beater. Thus constructed, the seed falls away from the cotton and never mixes with it again when once ginned. The cotton rests by gravity at all times directly upon the ginning members (knife, clearer and roller) where it remains until completely stripped from the seed. The clearer is made up of smooth steel plates reciprocated dissimultaneously, whose lower edges are provided with a series of short saw-cuts forming comb teeth, and are hollowed out or cut away adjacent the lower edge and under side to give relief and free movement to the cotton for permitting the roller to coöperate with said clearer teeth or comb in affording free and unrestricted stripping action.

Further features of my invention and advantages thereof will be pointed out in the course of the following description, taken with reference to the accompanying drawings, in which I have shown a preferred embodiment of the invention.

Figure 1:
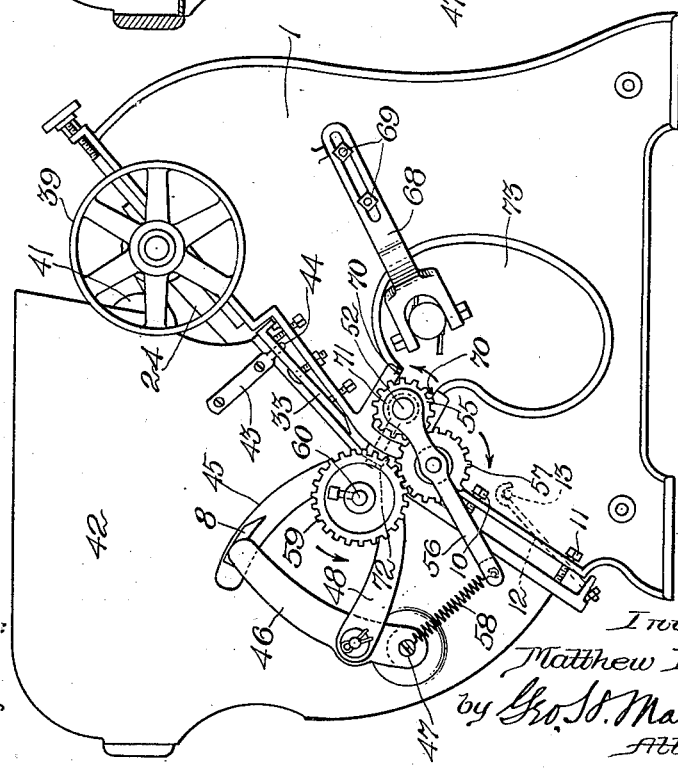

In the drawings, Figure 1 is a view of my gin in side elevation. Fig. 2 is a central transverse sectional view thereof but omitting the parts immediately behind the sectioned clearer plate in order to prevent confusion in the view; Fig. 3 shows the same in top plan; Fig. 4 is a view in side elevation of the beater; Fig. 5 is a broken plan view of the seed grid or hull-ejector; Figs. 6 and 7 are enlarged details showing the special clearer, Fig. 6 showing the same in longitudinal section and Fig. 7 in perspective, looking at the under side; and Fig. 8 is a perspective view of the roller.

Between end frames 1, 2 are mounted a roller 3, doffer 4, knife 5, clearer 6, rotary seed grid 7, and feeder or beater 8, whose position, construction, and operative connections constitute the essentials of my gin. A knife carrier 9 in the form of a heavy casting extends across the machine, resting on adjusting bolts 10, 11 and held up at its lower edge by adjustable breech hooks 12 hooking over bolts or a rod 13 and at its upper end secured by bolts 14, which serve also to clamp the knife 5 in place. A deflector 15 is preferably provided adjacent the under side of the knife to cause the roll to carry the cotton with certainty toward the bottom side of the roll. The clearer 6 contains a plurality of plates 16, three thereof being herein shown, all arranged in one and the same inclined plane. Each plate is serrated at its front edge by a series of parallel saw-cuts or kerfs 17, thereby providing a series of fine integral teeth 18, each having a slightly blunted forward end 19, a curved upper surface 20 and an undercut relief-space or recess 21 along the under side of the teeth across the entire width of each plate. This relief-recess is preferably relatively deep at its forward end, and is arched or undercut for the greater length of the teeth of the plate. The function and purpose of this feature of the invention is to afford free movement to the cotton fiber just as it is grabbed by the roller and has been partially stripped by the teeth 18 as the latter enter like fingers within the mass of cotton and pull or strip the fiber from the seeds. The clearer 6, it will be understood, moves rapidly back and forth over the edge of the knife 5, and as the clearer moves forward its teeth 18 are forced quickly into the mass of cotton which has slid down the smooth top surface of the plates 16 at the point where the cotton is being pulled in over the edge of the knife 5 by the roller 3. The inclined upper surfaces 20 of the teeth, coöperating with the constant pulling of the roller, wedge the cotton apart and separate it with great rapidity and delicacy from its seeds, thereby causing the cotton to pull more or less tightly into the spaces between the teeth, and, accordingly, it is desirable that this stripped or taut cotton shall be entirely free to move as required by the roller, when the clearer is in its forward overlapping position, without being further interfered with by the clearer, especially by the backward movement thereof. I have found that this relief-recess or undercut arch formation greatly facilitates the quality and quantity of the work. It also prevents the cotton from being torn or being pulled backward by the return movement of the clearer over the roller. The curved upper surface of the teeth also gets under the seed with an upward combing, raising action, and tends to aid in causing as much of the stripping action as possible to be accomplished by the teeth, instead of compelling the cotton to be pinched and bruised between the knife and the front under edge of the clearer as heretofore. The plates 16 are provided on their upper surfaces with heavy brackets or ears 22 and cross bars 23 on which are loosely mounted arms 24 provided with eccentric straps 25 at their upper ends, engaged by eccentrics 26 fast on an operating shaft 27 whose journals 28 are adjustably supported on inclined ledges 29 of the frame and held in adjustment by set bolts 30 and hand adjusting bolts 31 so that thereby the clearer mechanism may be quickly adjusted as a whole toward and from the blade 5. The eccentrics are set at equidistant angles from each other so as to make the sections 16 of the clearer move out of step with each other, and the angle of the clearers is controlled by bolts 32 and a transverse bed plate 33 on which the sections 16 of the clearer slide and to which they are held by straps or plates 34. The bed plate has an inturned top edge 330 to engage over studs 331 in a depressed edge portion of the top edge of the end frames, whereby it is snugly and yet removably held. The roller 3 is driven by a large sprocket wheel 35 engaged by a sprocket chain 36 driven by a sprocket wheel 37 on one end of the driving shaft 27, which at its other end is provided with fast and loose pulleys 38, 39, and the doffer 4 gets motion from the same shaft by means of a belt 40. The sprocket chain 36 is held tight by an idler 41.

The parts which coöperate with the knife 5 and clearer 6 are carried by the hopper portion 42 of the machine and are all removable together so as to open the ginning mechanism of the gin instantly for repairs, inspection or the removal of any large obstruction which cannot pass through the grid. The sides of the hopper conform at their lower edges approximately to the adjacent parts of the machine, as best shown in Fig. 1, and at their upper edges are provided with straps 43 whose projecting pointed ends 44 pass through holes provided therefor in an adjacent part, herein shown as in the bed piece 33. The beater 8 consists of a transverse bar having a pointed or reduced lower edge to engage the cotton just above or opposite the roll between the knife and clearer, said bar extending through slots 45 in the hopper-sides where it is supported by arms 46 pivoted at 47 and actuated by a lever 48 provided at its forward end with an overhanging shoulder 49 engaged twice in each revolution of the roller by cam projections 50, 51 carried by the roller shaft 52. The lever 48 has a thin flange 53, adapted to ride behind the hub 54 which carries said cam projections 50, 51, in order to maintain the lever 48 in proper position. Fast on the same shaft 52 is a pinion 55 and a loosely pivoted arm 56 which carries a gear 57 in mesh with the pinion 55 and adapted to be held upward by a detachable spring 58 in driving engagement with a gear 59 fast on the grid shaft 60. When therefore it is desired to get at the ginning mechanism at the ginning point thereof, all that is necessary is to unhook the spring 58 from the lever 56 and lift up the hopper thereby raising the prongs 44 from their engaged position. The seed grid consists of a series of stiff wires bent into S-shape as best shown in Fig. 2, and arranged spirally on the shaft or rod 60, see Fig. 5, and a set of stationary spikes or depending wire fingers 61 extending downwardly in front of the grid from a transverse support 62 being spaced so as to permit the S-shaped fingers or prongs of the rotary member to pass between them as it rotates in the direction of the arrow. The bent ends of the finger portions of the grid 7 continuously poke forward the cotton and keep it from working downwardly beyond the knife, without any tendency to pull the cotton away from the roller, and because of the spiral arrangement, the grid keeps continually opening for a restricted area adjacent the knife so as to permit the seeds, hulls, and all stripped foreign particles to drop down away from the cotton. The bottom of the hopper has front and back portions 63, 64, which direct the cotton to the ginning point. The roller is composed of layers of grass cloth or hair cloth fabric and canvas, wound spirally so as to leave spaces or openings 65 between the fibrous strips or portions 66. The doffer 4, instead of containing brushes or the like as usual, is provided with longitudinal rubber strips 67 and the doffer is rotated so that these strips have a downward movement when they strike against the roller 3, the result being a superior doffing action without any tendency to tangle, break or mix up the cotton fibers. The doffer shaft is adjustably supported in a hanger 68, see Fig. 1, secured by bolts 69 to the frame. The roller shaft 52 has its bearings mounted in a lateral offset 70 held adjustably therein by a strap 71 whose threaded upper end passes through the frame, see Fig. 1, and is secured by a nut 72. Below the lateral opening 70 the frame is provided with a large opening 73 to permit the quick endwise removal of the roller whenever desired.

In use, the cotton is thrown into the hopper and falls by its own weight directly against the roller 3 at the ginning point thereof, between the knife 5 and clearer 6. As soon as the machine is started the roller moves slowly downward toward the edge of the knife 5 and the different parts of the clearer 6 reciprocate with extreme rapidity out of step with each other toward the knife, the finger-like teeth 18 thereof entering the cotton and gently but rapidly opening it with a fluffing stripping action which coöperates with the pulling action of the roller to strip the seeds clean of cotton without tearing or injuring the staple and to free the cotton from all hulls, leaves, grit, stones and other foreign matter. As this is taking place the rotary grid agitates the cotton gently by pushing the bottom front portion of the cotton continually forward and at the same time opening the bottom for the escape of the seeds and foreign matter as they are ginned out of the cotton. The spiral arrangement of the S-shaped wires or pins keeps the bottom continually opening and shutting as it were, thus allowing time for the cotton, hulls, seeds, etc., to fall out and yet preventing any escape of cotton. The rounded front ends of these bent pins or wires, as they come up against the cotton, move the cotton with extreme gentleness and have no tendency to cling to the cotton or to carry it around but serve simply to keep pushing the cotton up to the ginning roller until it is entirely stripped from the seeds. While this is taking place the feeder or beater 8 keeps falling by gravity against the cotton, being raised twice in each revolution of the roller and then permitted to fall, remaining down during the greater part of the time, the result of this intermittent pressure upon the cotton being to prevent the possibility of the cotton forming a bridge above the roller as the bottom part is ginned away, and also to force the ginning as it were, causing the machine to gin at full capacity all the time. As the roller carries the cotton downward, as distinguished from the usual reverse movement, I find that nearly all of the cotton falls by gravity and that very little work is required of the doffer. The doffer, however, because of its special construction, being made of flexible longitudinal strips as distinguished from bristles or prongs, keeps the roller absolutely clean of cotton as its surface moves upward from the doffer, and yet the doffer does not tend to gather the cotton to itself nor clog in any way. The independent hand adjustment of the combing device or clearer permits the clearer to be brought quickly into absolutely true ginning position with relation to the roller, and the suspended roller bearing with its externally operable supporting strap or hanger permits the roller to be readily and quickly adjusted, while the simple removal of the hopper and all its connected parts exposes all the ginning portion of the machine instantly to inspection and the like.

One of the most important features of my present invention resides in arranging the ginning members at substantially the angle shown, which is approximately thirty-five degrees, whereby the cotton receives its main support directly from and by the roller, knife, and clearer, and yet is in such a position that it slides down by gravity as the ginning proceeds, and all the seeds, etc., drop out immediately instead of remaining and being churned up with the cotton and bruised or mangled with the fiber by the combing, beating, and clearing action of the adjacent parts. The result is that the seeds never mix with the cotton again after they are once stripped therefrom and yet the cotton is held automatically against the surface of the roller until the seeds are completely stripped. The location and shape of the revolving seed grid is so constructed that it acts practically as a huller so that the seeds and hulls fall out by gravity as the spirally arranged grid opens for the purpose at every revolution. As the cotton feeds by gravity and the beater 8 is arranged to have a blow-like fall, the beater is made exceedingly light as its main function is simply to prevent the cotton from accidentally bridging across just above the ginning mechanism due to the exceedingly quick ginning away of the lower portion from the bottom of the pile of cotton. If a bunch of ginned cotton should fall by mistake against the roller along with the unginned cotton no harm would be done and no crash could happen due to springing or displacing the doctor knife because the rapidly moving combing teeth instantly comb out and loosen up any such bunch of cotton, thereby making it Having described my invention, what I claim as new and desire to secure by Letters Patent is:

1. In a roller gin, a reciprocating clearer, a coöperative knife, a roller, and cotton delivery means permitting the cotton to lodge on the roller at the ginning point thereof, and movable agitating means normally just back from the edge of the knife, coöperating at different times with separate portions of said knife to provide an escape-opening for seeds and with other portions of the knife to provide a retaining member for the cotton.

2. In a roller gin, a reciprocating clearer, a coöperative knife, a roller, and cotton delivery means permitting the cotton to lodge on the roller at the ginning point thereof, said clearer and knife being arranged tangentially of said roller at an angle of approximately thirty-five degrees to the horizontal, and movable agitating means coöperating with said knife to afford at any one time a seed-outlet at a portion only of the length of the knife, with provision to constitute at the same time a retaining member at other portions of the length of said knife to hold forward the cotton in position to be ginned.

3. In a roller gin, opposite end frames, a roller mounted to rotate therein, an upper reciprocating clearer, a knife carrier in the form of a heavy flat plate extending across the machine below the roller at a steep angle with relation to the direction of movement of said clearer, adjusting bolts extending through the adjacent edge of the frame for the plate to rest upon for changing the angle of the plate by their adjustment in the frame, the plate having an inwardly projecting lower flanged edge, breech hooks adjustably secured in the flange of said lower edge and extending obliquely to the plate upwardly within the frame of the machine, means projecting inwardly from said end frames for the hooked ends of said hooks to hook over for supporting the weight of the plate, a ginning knife clamped beneath the upper edge of said plate in ginning relation to said roller, and adjustable means for holding the upper edge of said plate and said knife toward the roller and end frames.

4. In a roller gin, opposite end frames having oblique top edges, a transverse bed plate removably supported at its ends on said top edges, adjusting means for varying the angle of said bed plate with relation to said top edges, an eccentric shaft and its eccentrics, bearings for said shaft adjustably mounted on said oblique top edges of the end frames for up and down movement lengthwise of said edges, adjusting means for accomplishing said movement of said bearings, a clearer mounted in sliding engagement on the upper side of said transverse bed plate, eccentric straps, arms extending from said straps and pivotally connected to said clearer, and a ginning knife and roller mounted in said end frames to coöperate with said clearer.

5. In a roller gin, opposite end frames having oblique top edges provided with depressed portions, a transverse bed plate held in said depressed portions with its flat top surface in position to receive a clearer, a clearer mounted to slide on said bed plate, actuating means pivotally connected to said clearer mounted on the top edges of the end frames above said depressed portions approximately in line with said bed plate, and a ginning knife and roller mounted in said end frames to coöperate with said clearer.

6. In a roller gin, opposite end frames having oblique top edges provided with depressed portions, a transverse bed plate mounted in said depressed portions, said bed plate having an inturned top edge to engage over studs projecting upwardly in the bottom of said depressed portions for said inturned top edge to hook over, adjusting bolts projecting upwardly from the bottoms of said depressed portions for said bed plate to rest upon whereby its angular position is controlled, a clearer mounted to slide on said bed plate, actuating means pivotally connected to said clearer mounted on the top edges of the end frames above said depressed portions approximately in line with said bed plate, and a ginning knife and roller mounted in said end frames to coöperate with said clearer.

7. In a roller gin, opposite end frames having oblique top edges, a bed plate 33 removably supported on said top edges and extending transversely of the gin, a clearer held in continuous sliding engagement with said bed plate, operating means mounted on the edges of said end frames above said bed plate to reciprocate said clearer in its sliding movement, and a ginning knife and roller mounted in said end frames to coöperate with said clearer.

8. In a roller gin, a main supporting frame, a roller arranged to rotate therein, a knife arranged tangentially of said roller, a coöperating clearer, means to reciprocate said clearer, a movable bed piece carried by said frame in supporting position beneath said clearer, and adjusting means to vary the angle of said bed piece and hence of the clearer with relation to said roller.

9. In a roller gin, a roller, a knife, a clearer composed of a plurality of clearer plates set side by side in the same plane, a rotary shaft, connections from said shaft to said plates for reciprocating the latter out of step with each other, and means for adjusting said clearer and its operating mechanism bodily toward and from said roller, said adjusting mechanism including means for effecting said bodily adjustment independently at the opposite ends of the clearer.

10. In a roller gin, a ginning roller, and a clearer consisting of a series of flat, reciprocated plates arranged side by side, each plate terminating at its lower edge in a series of integral clearer teeth extending freely forward separate from each other in the plane of the plate formed by fine parallel kerfs cut back into and transversely through the plates and the entire plate and each tooth being hollowed or arched on its under side slightly back from and parallel to said edge.

11. In a roller gin, a ginning roller, and a clearer consisting of a series of flat, reciprocated plates arranged side by side, each plate terminating at its lower edge in a series of integral parallel-sided clearer teeth extending freely forward separate from each other in the plane of the plate formed by fine parallel kerfs cut back into and through the body of the plate so as to make the teeth long, slender and parallel sided, said lower edge having a forwardly and downwardly beveled top surface at the forward ends of the teeth providing wedge-shaped lifting surfaces for said teeth.

12. In a roller gin, a ginning roller and a clearer, with separate, spaced apart teeth, each tooth being cut away at a point intermediate its length on its under side back from its front end and forward of its rear end to form a relieved space or arch between the roller and the clearer teeth back from the front ends of the latter and forward of the body of the clearer extending entirely across the clearer for facilitating the stripping movement of the cotton.

13. In a roller gin, a ginning roller, and a toothed clearer plate, the teeth being separated by intervening spaces extending entirely through the plate from the front ends back to the rear extremities of the teeth, and beveled on their upper sides opposite the roller to a thin blunt point, and being relieved or cut away on their under sides slightly back from their said points toward the body of the clearer to a point adjacent and slightly in front of their rear ends next to the body of the plate.

14. In a roller gin, a ginning roller, a clearer, means for delivering cotton to said roller, and yielding means located adjacent the ginning region of said roller and clearer for opposing the free escape of seed and having portions movable to provide openings for the said free escape of the seeds intermittently, first at one point and then at another, in its length.

15. In a roller gin, a ginning roller, a lower knife, an upper reciprocating clearer, said knife and clearer being set at an oblique angle capable of permitting the ginned seeds to fall by gravity from the edge of the knife while at the same time supporting the cotton at the ginning point of the roller, means above said knife at the lower side of the cotton to hold the cotton from falling with the seeds, successive limited portions of said holding means being momentarily movable away from said knife to permit the seeds to drop out while the remainder of the holding means is still in seed-retaining position.

16. In a roller gin, a ginning roller, a lower knife, an upper reciprocating clearer, said knife and clearer being set at an oblique angle capable of permitting the ginned seeds to fall by gravity from the edge of the knife while at the same time supporting the cotton at the ginning point of the roller, and means above said knife at the lower side of the ginning point to push the cotton forward to the edge of the knife, said means having a rounded pushing surface arranged for rotary movement to engage with the cotton in an opposite direction to the movement of the adjacent surface of the roller.

17. In a roller gin, a ginning roller, a lower knife, an upper reciprocating clearer, said knife and clearer being set at an oblique angle capable of permitting the ginned seeds to fall by gravity from the edge of the knife while at the same time supporting the cotton at the ginning point of the roller, and means above and at the same side as said knife to push the cotton forward to the edge of the knife, said means including a rotary device containing a longitudinal series of laterally extending fingers having their free ends bent rearward away from their direction of movement to present a rounded front surface to engage the cotton.

18. In a roller gin, a ginning roller, a knife, and a reciprocating clearer, said knife and clearer being disposed at an angle capable of permitting the ginned seeds to fall by gravity from the edges thereof while at the same time tending to support the cotton at the ginning point of the roller, and means adjacent to said ginning edges in position to support the adjacent side of the body of the cotton, said means including a rotary device containing a longitudinal series of laterally extending fingers thereon, spirally arranged along said rotary device, having their free ends bent rearward away from their direction of movement to present a rounded front surface to engage the cotton.

19. In a roller gin, a ginning roller, a lower knife, an upper reciprocating clearer, said knife and clearer being set at an oblique angle capable of permitting the ginned seeds to fall by gravity from the edge of the knife while at the same time supporting the cotton at the ginning point of the roller, and means above said knife in position to support the adjacent side of the body of the cotton, said means including a rotary device containing a longitudinal series of laterally extending fingers set spirally along said rotary device having their free ends bent rearward away from their direction of movement to present a rounded front surface to engage the cotton.

20. In a roller gin, a ginning roller, a lower knife, an upper reciprocating clearer, said knife and clearer being set at an oblique angle capable of permitting the ginned seeds to fall by gravity from the edge of the knife while at the same time supporting the cotton at the ginning point of the roller, means above said knife at the lower side of the cotton to push the cotton forward to the edge of the knife, said means including a rotary device containing a longitudinal series of laterally extending fingers set spirally along said rotary device having their free ends bent rearward to present a rounded front surface to engage the cotton, and a series of overhanging stationary fingers spaced apart to permit the revolving fingers to pass therebetween.

21. In a roller gin, a ginning roller, a knife, a reciprocating clearer coöperating with said knife tangentially of said roller, cotton-delivery means to deliver cotton to said roller, intermittingly operating pressing means to press downwardly on the cotton adjacent the feeding point of the roller for forcing the ginning process, and means for intermittently raising said pressing device, the latter being arranged to fall by gravity for its pressing operation.

22. In a roller gin, a ginning roller, a knife, a reciprocating clearer coöperating with said knife tangentially of said roller, cotton-delivery means to deliver cotton to said roller, intermittingly operating pressing means to press downwardly on the cotton adjacent the feeding point of the roller for forcing the ginning process, and means for intermittingly raising said pressing device, the latter being arranged to fall by gravity for its pressing operation, said raising means being timed to raise the pressing device quickly at relatively long intervals.

23. In a roller gin, a ginning roller, a knife and clearer arranged tangentially of said roller and extending obliquely downward and forward, combined with cotton feeding and delivery mechanism, supporting means therefor including detachable securing means for permitting said feeding and delivery mechanism and all the connected parts to be lifted bodily from the rest of the machine, so as fully to expose the roller, knife and clearer, and driving means movably mounted in geared relation to a moving part of the stationary portion of the machine and adapted to be moved into driven relation with the movable part of the machine when the latter is in place.

24. In a roller gin, a frame, a ginning roller, a clearer, a knife coöperating with said roller and clearer, and a heavy plate carrying at its upper edge said knife and provided adjacent its lower edge with upwardly extending adjustable hooks engaging said frame whereby said plate and knife are held for adjustment toward and from said roller.

25. In a roller gin, a roller, a clearer, a stationary knife, mountings for said parts, and a movable member mounted and arranged to coöperate with said parts to present a transversely converging delivery chute to an exposed surface of said roller, said member having provision to intermittently open a lower side portion of said chute at different portions of the length of said roller at different times.

26. In a roller gin, a roller, a clearer, a stationary knife, mountings for said parts, and a movable member mounted and arranged to coöperate with said parts to present a transversely converging delivery chute to an exposed surface of said roller, said member having provision to intermittently open a lower side portion of said chute along successive portions of the length of said roller.

27. In a roller gin, a roller, a stationary knife, a reciprocatory clearer, mountings for said parts, a rotary member coöperatively arranged with said clearer to form a transversely converging delivery chute to an exposed portion of said roller, the said rotary member being constructed and arranged to roll cotton over onto said exposed roller surface, and connections to rotate said roller and said rotary member to cause their adjacent portions to move in opposite directions.

28. In a roller gin, a ginning roller, means coöperating with said roller for ginning the cotton, said parts being so disposed as to permit the seeds to fall by gravity therefrom, means adjacent thereto adapted to support the body of the cotton at the ginning point, said means including a rotary device containing laterally extending fingers disposed so as to pass said ginning area intermittently during rotation.

In testimony whereof, I have signed my name to this specification, in the presence of two subscribing witnesses.

MATTHEW PRIOR.

Witnesses:
M. J. SPALDING,
EDWARD MAXWELL.

Copies of this patent may be obtained for five cents each, by addressing the "Commissioner of Patents, Washington, D. C."